United States Patent [19]

Dean et al.

[11] 4,230,395
[45] Oct. 28, 1980

[54] OPTICAL CABLES WITH LOOSELY HOUSED OPTICAL GUIDES

[75] Inventors: Noel S. Dean, Greater Manchester; Joseph E. G. Chapman, Prescot; Eric L. Williams, Newton-le-Willows, all of England

[73] Assignee: BICC Limited, London, England

[21] Appl. No.: 654,868

[22] Filed: Feb. 3, 1976

[30] Foreign Application Priority Data

Feb. 5, 1975 [GB] United Kingdom ............... 4949/75

[51] Int. Cl.³ ............................................. G02B 5/16
[52] U.S. Cl. ............................................... 350/96.23
[58] Field of Search .......... 350/96 B, 96 BC, 96 WG, 350/96.23

[56] References Cited

U.S. PATENT DOCUMENTS

| | | | |
|---|---|---|---|
| 3,699,950 | 10/1972 | Humphrey et al. | 350/96 B X |
| 3,766,307 | 10/1973 | Andrews | 350/96 B X |
| 3,817,595 | 6/1974 | Edelman et al. | 350/96 B |
| 3,865,466 | 2/1975 | Slaughter | 350/96 B |
| 3,887,265 | 6/1975 | Margolis et al. | 350/96 B |
| 3,955,878 | 5/1976 | Nowak | 350/96 B X |
| 4,000,936 | 1/1977 | Gloge | 350/96 B X |
| 4,037,923 | 7/1977 | Beal | 350/96 B |

FOREIGN PATENT DOCUMENTS

| | | | |
|---|---|---|---|
| 2523738 | 12/1975 | Fed. Rep. of Germany | 350/96 B |
| 2525067 | 12/1975 | Fed. Rep. of Germany | 350/96 B |

*Primary Examiner*—John K. Corbin
*Assistant Examiner*—John D. Lee
*Attorney, Agent, or Firm*—Buell, Blenko, Ziesenheim & Beck

[57] ABSTRACT

An optical cable comprises a plurality of separately formed flexible tubes in each of some or all of which is or are loosely housed at least one optical bundle and/or at least one seprate optical fibre. The plurality of tubes is surrounded by an outer protective sheath in which preferably they are so loosely housed as to permit limited relative movement between the tubes when the optical cable is flexed. Where the optical cable is likely to be subjected to a tensile force, preferably at least one elongate reinforcing member is embedded in or surrounded by the outer protective sheath.

22 Claims, 4 Drawing Figures

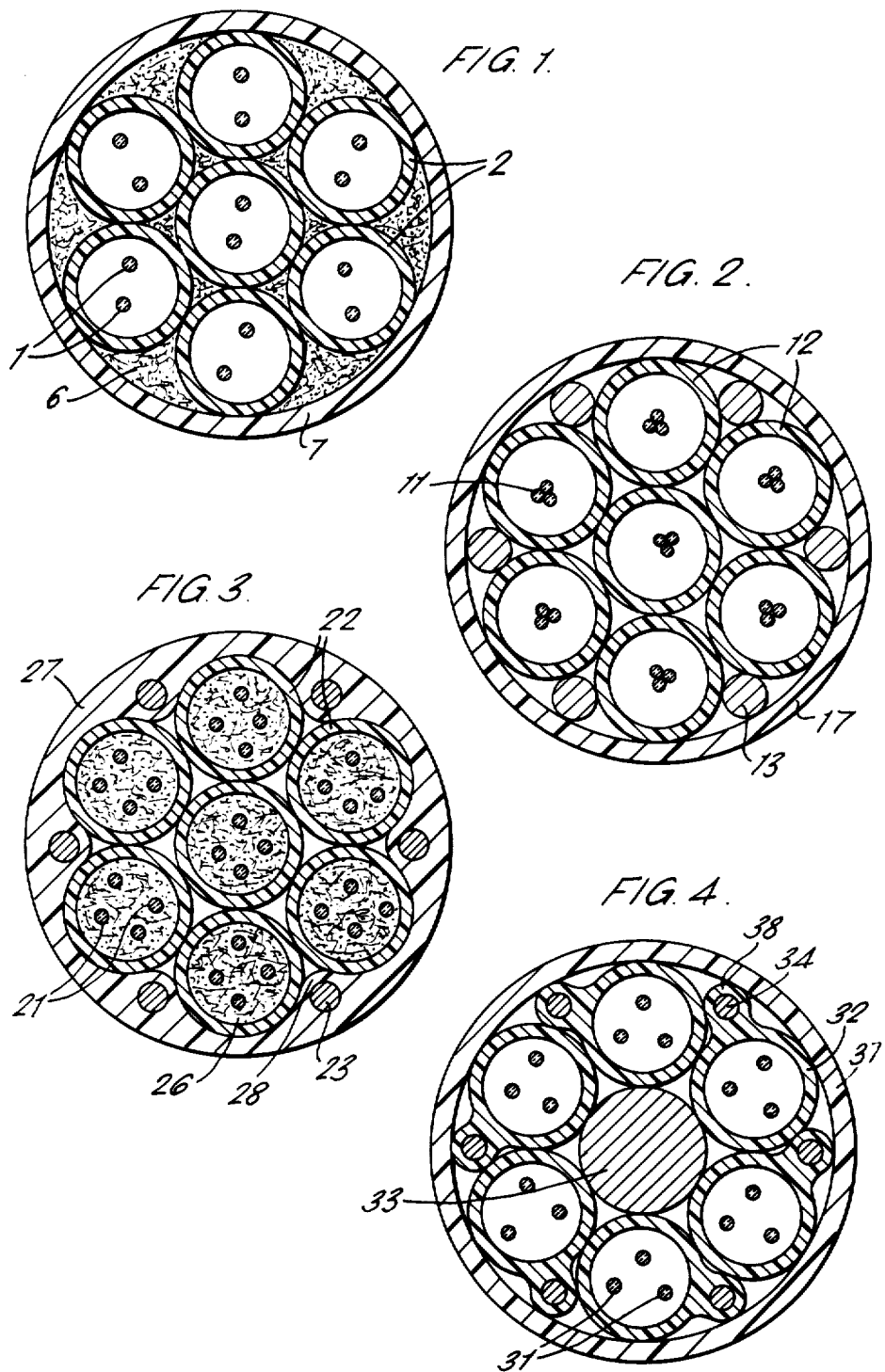

OPTICAL CABLES WITH LOOSELY HOUSED OPTICAL GUIDES

This invention relates to optical cables for the transmission of the ultraviolet, visible and infra-red regions of the electromagnetic spectrum, which regions, for convenience, will hereinafter all be included in the generic term "light", and especially, but not exclusively, to optical cables for use in the communication field adapted for transmission of light having a wavelength within the range 0.8 to 1.3 micrometers.

For the purpose of transmitting light in an optical transmission system it has been proposed to employ optical guides in the form of cables including one or more than one optical fibre. Each optical fibre is usually of substantially circular cross-section but, in some circumstances, it may be of non-circular cross-section.

Optical cables with which the invention is concerned include cables including one or more than one optical fibre of glass or other transparent material whose refractive index is arranged to decrease over at least a part of the radius of the fibre in a direction towards the outer surface of the fibre and cables including one or more than one optical fibre of composite form comprising a core of transparent material clad throughout its length with another transparent material of lower refractive index which, by total internal refraction of light being transmitted along the fibre, confines at least a major proportion of the light within the core. A composite optical fibre is generally, but not necessarily, made up of two glasses of different refractive indices, the glass forming the core having a higher refractive index than the glass forming the cladding; the refractive index of the glass of the core may gradually decrease in a direction towards the outer surface of the core over at least a part of the distance between the central axis of the core and its outer surface. In an alternative form of composite fibre the core may be made of a transparent liquid having a higher refractive index than that of the cladding.

According to the present invention an optical cable comprises a plurality of separately formed tubes of rubber or plastics material in each of some or all of which is or are loosely housed at least one optical bundle as hereinafter defined and/or at least one separate optical fibre and, surrounding the plurality of tubes, an outer protective sheath.

By the expression "optical bundle" as used in this specification and in the claims forming part thereof is meant a group of optical fibres or a group of fibres including at least one optical fibre and at least one non-optical reinforcing fibre or other reinforcing elongate member. Each optical fibre of the optical bundle may be used independently as a separate light guide, each with its own modulated light source and detector, or a plurality of optical fibres of a bundle may be used together as a single light guide, with a single light source.

By virtue of being housed loosely in a tube, limited relative movement between the optical fibres of the or each optical bundle and/or between the separate optical fibres can take place when the cable is flexed.

The tubes of the optical cable are preferably arranged with their axes extending substantially parallel to one another and they may be arranged in one or more than one layer around an elongate central core, which itself may be a tube of rubber or plastics material in which is or are loosely housed at least one optical bundle and/or at least one separate optical fibre. Each tube may be of substantially circular cross-section or, where tubes are arranged in one or more than one layer around an elongate central core of circular cross-section, the tubes of the or each layer may each have a cross-section approximating to a sector of an annulus. Each tube is preferably an extruded tube of polyethylene or other suitable plastics material.

Where there is any risk that the optical cable will be subjected to a tensile force that may be sufficient to break one or more of the optical fibres, preferably at least one elongate reinforcing member is embedded in or is surrounded by the outer protective sheath.

By an elongate reinforcing member is meant an elongate member of such a material and of such a cross-sectional area having regard to the material or materials and cross-sectional area of the bundle or bundles and/or of the separate optical fibre or fibres that the strain otherwise imparted to the or each optical fibre when the cable is stressed in such a way as to tend to subject the or any optical fibre to a tensile force is eliminated or reduced at least to a substantial extent by the reinforcing member or members.

A plurality of elongate reinforcing members may be embedded in the sheath at spaced positions, preferably uniformly spaced positions, around the sheath and in this case the reinforcing members may be embedded in inwardly projecting ribs on the internal surface of the sheath which partly fill outermost interstices between the tubes. Alternatively, or additionally, at least one elongate reinforcing member may be assembled with the plurality of tubes. Where one or more than one layer of tubes is or are arranged around an elongate central core, the central core may be constituted by an elongate reinforcing member and/or one or more than one elongate reinforcing member may be arranged in the layer or at least one of the layers. At least one elongate reinforcing member surrounded by the sheath may be embedded in an outwardly projecting rib on the external surface of at least one of the separately formed tubes.

The or each elongate reinforcing member is preferably of a material which has a Young's Modulus of at least that of glass, i.e. of at least $6.9 \times 10^4$ MN/m$^2$. It may comprise a plurality of solid elements stranded together, a single solid element, for instance of steel or any other suitable material having the necessary Young's Modulus, or a bundle of carbon fibres or of fibres of other suitable material, e.g. non-optical glass fibres; the fibres may be at least partially embedded in a body of encapsulating material throughout substantially the whole length of the bundle.

One or more than one of the tubes may also have loosely housed in the tube at least one elongate electric conductor. Where a tube houses a single electric conductor, the conductor may be bare; where two or more conductors are housed in a tube, preferably each conductor has a covering of insulating material.

The outer protective sheath of the optical cable is preferably an extruded tube of rubber or plastics material in which the tubes loosely housing optical fibres are themselves so housed in the outer sheath as to permit limited relative movement between the tubes when the optical cable is flexed.

With a view to preventing mechanical damage to the surface of any optical fibre arising from abrasion with another optical fibre or other fibre loosely housed in the same tube when flexing of the optical cable occurs, the interstices between the bundles and/or between the separate optical fibres and between the or each bundle and/or the or each fibre and the wall of at least one, and preferably each, of the tubes may be filled throughout the length of the cable with a filling medium of a grease-like nature which will permit relative sliding movement between bundles and/or fibres when the cable is flexed. If the filling medium is a water-impermeable medium customarily employed in fully-filled telecommunication cables it will also serve as a longitudinally continuous barrier to the ingress of moisture along interstices in the tube. With a view to preventing water that may enter the optical cable through a damaged sheath from travelling along the cable in interstices between the tubes and between the tubes and the sheath, these interstices may be filled throughout the length of the cable with a water-impermeable medium of a grease-like nature. Preferably, in both cases the filling medium employed consists of, or comprises as a major constituent, petroleum jelly.

Where the interstices in a tube and/or the interstices between the tubes are filled with petroleum jelly or other water-impermeable medium, to reduce the risk that the water-impermeable medium might permeate into the rubber or plastics material of the tube and/or of the sheath, the wall of the tube and/or the sheath may be lined with a material that is impermeable to the water-impermeable medium. Where the medium is petroleum jelly the lining may be formed of a metallic tape having on at least its outer surface a coating of polyethylene or other plastics material that is preferably bonded to the material of the tube or of the sheath, as the case may be.

As a further precaution against mechanical damage arising from the contact between fibres housed in a tube, some or all of the optical fibres may have a continuous coating of a metallic material as described and claimed in the Complete Specification of our co-pending British Patent Application No. 54688/74.

The invention is further illustrated by a description, by way of example, of four forms of optical cable with reference to the accompanying diagrammatic drawing which shows transverse cross-sectional end views of the four optical cables.

The optical cable shown in FIG. 1 comprises seven tubes 2 of extruded propylene-ethylene copolymer in each of which are loosely housed two separate optical fibres 1. The tubes 2 are arranged with their axes substantially parallel, with six tubes arranged in a circle around a tube constituting an elongate central core. The tubes 2 are loosely housed in an extruded outer protective sheath 7 of propylene-ethylene copolymer. If desired, the interstices between the tubes 2 and between the tubes and the sheath 7 throughout the length of the cable may be filled with petroleum jelly 6.

In the optical cable shown in FIG. 2 seven tubes 12 of extruded polyethylene are arranged with their axes substantially parallel, with six tubes arranged in a circle around a tube constituting an elongate central core. Each tube 12 loosely houses an optical bundle 11 comprising three optical fibres assembled together. Positioned in the outer interstices between the tubes 12 are six reinforcing members 13 each comprising a plurality of steel wires stranded together. The assembly of tubes 12 and reinforcing members 13 is surrounded by an extruded outer protective sheath 17 of polyethylene.

The optical cable shown in FIG. 3 comprises seven tubes 22 of extruded propylene-ethylene copolymer in each of which are loosely housed four separate optical fibres 21, the interstices between the optical fibres throughout the length of the optical cable being substantially filled with petroleum jelly 26. The tubes 22 are arranged with their axes substantially parallel, with six tubes arranged in a circle around a tube constituting an elongate central core. An extruded outer protective sheath 27 of propylene-ethylene copolymer surrounds the assembly of tubes 22 and has, projecting inwardly from its internal surface, six ribs 28 which extend substantially parallel to the tubes and which partially fill the outer interstices between the tubes. A reinforcing member 23 comprising a single steel wire is embedded in each rib 28.

In the optical cable shown in FIG. 4, six tubes 32 of extruded polyethylene are arranged helically around a central reinforcing member 33 comprising a single steel wire. Each tube 32 loosely houses three separate optical fibres 31 and has projecting outwardly from and integral with its external surface a rib 38 in which is embedded an reinforcing element 34 comprising a single steel wire. As will be seen each rib 38 partially fills an outer interstice between adjacent tubes 32. The assembly of tubes 32 is surrounded by an extruded outer protective sheath 37 of polyethylene.

In each of the four optical cables illustrated, when the cable is flexed limited relative movement between the separate optical fibres or between the optical fibres of the optical bundle can take place.

What we claim as our invention is:

1. An optical cable comprising a plurality of separately formed flexible tubes in at least one of which at least one optical guide comprising at least one optical fibre, which guide as a unit has an overall diameter that is substantially less than the internal diameter of the tube, is so housed that the optical guide as a unit is loose with respect to the tube throughout the whole length of the cable and generally spaced from the tube so that limited relative movement between the optical guide as a unit and the tube can take place at any transverse cross-section of the cable when the cable is flexed and, surrounding the plurality of tubes, an outer protective sheath.

2. An optical cable as claimed in claim 1, wherein the tubes are arranged with their axes extending substantially parallel to one another.

3. An optical cable as claimed in claim 1, wherein the tubes are arranged in at least one layer around an elongate central core.

4. An optical cable as claimed in claim 3, wherein the elongate central core is a flexible tube in which is loosely housed at least one optical guide comprising at least one optical fibre, which guide as a unit has an overall diameter that is substantially less than the internal diameter of the tube and generally spaced from the tube.

5. An optical cable as claimed in claim 4, wherein the tubes of the or each layer are each of a cross-section approximating to a sector of an annulus.

6. An optical cable as claimed in claim 1, wherein the tubes are each of substantially circular cross-section.

7. An optical cable as claimed in claim 1, wherein each tube is an extruded tube of plastics material.

8. An optical cable as claimed in claim 1, wherein the interstices between the tubes and between the tubes and the sheath are filled throughout the length of the cable with a water-impermeable medium of a grease-like nature.

9. An optical cable as claimed in claim 1, wherein at least one of the tubes also loosely houses at least one elongate electric conductor.

10. An optical cable as claimed in claim 1, wherein the outer protective sheath is an extruded tube of plastics material.

11. An optical cable comprising a plurality of separately formed flexible tubes in at least one of which at least one optical guide comprising at least one optical fibre, which guide as a unit has an overall diameter that is substantially less than the internal diameter of the tube and is so housed that the optical guide as a unit is loose with respect to the tube throughout the whole length of the cable and generally spaced from the tube so that limited relative movement between the optical guide as a unit and the tube can take place at any transverse cross-section of the cable when the cable is flexed and, surrounding the plurality of tubes, an outer protective sheath, the tubes being so loosely housed in the outer sheath as to permit limited relative movement between the tubes when the optical cable is flexed.

12. An optical cable comprising a plurality of separately formed flexible tubes in at least one of which at least one optical guide comprising at least one optical fibre, which guide as a unit has an overall diameter that is substantially less than the internal diameter of the tube and is so housed that the optical guide as a unit is loose with respect to the tube throughout the whole length of the cable and generally spaced from the tube so that limited relative movement between the optical guide as a unit and the tube can take place at any transverse cross-section of the cable when the cable is flexed, an outer protective sheath surrounding the plurality of tubes and, embedded in the outer protective sheath, at least one elongate reinforcing member.

13. An optical cable as claimed in claim 12, wherein a plurality of elongate reinforcing members is embedded in the sheath at spaced positions around the sheath.

14. An optical cable as claimed in claim 13, wherein reinforcing members are embedded in inwardly projecting ribs on the internal surface of the sheath which partially fill outermost interstices between the tubes.

15. An optical cable as claimed in claim 12, wherein the tubes are arranged in at least one layer around an elongate reinforcing member.

16. An optical cable as claimed in claim 12, wherein the or each reinforcing member has a Young's Modulus of at least $6.9 \times 10^4$ MN/m$^2$.

17. An optical cable comprising a plurality of separately formed flexible tubes in at least one of which at least one optical guide comprising at least one optical fibre, which guide as a unit has an overall diameter that is substantially less than the internal diameter of the tube and is so housed that the optical guide as a unit is loose with respect to the tube throughout the whole length of the cable and generally spaced from the tube so that limited relative movement between the optical guide as a unit and the tube can take place at any transverse cross-section of the cable when the cable is flexed, at least one elongate reinforcing member assembled with the plurality of tubes, and, surrounding the plurality of tubes and the reinforcing member or members, an outer protective sheath.

18. An optical cable as claimed in claim 17, wherein the tubes are arranged in at least one layer around an elongate central core and at least one elongate reinforcing member is arranged in the layer or in at least one of the layers.

19. An optical cable as claimed in claim 18, wherein the elongate central core is a reinforcing member.

20. An optical cable as claimed in claim 17, wherein at least one elongate reinforcing member is embedded in an outwardly projecting rib on the external surface of at least one of the tubes.

21. An optical cable as claimed in claim 20, in which at least one layer of tubes is arranged around an elongate central core, wherein each tube of at least one of the layers has an outwardly projecting rib on its external surface in which is embedded an elongate reinforcing member, the rib of each tube partially filling the interstice bounded by the tube and an adjacent tube.

22. An optical cable as claimed in claim 17, wherein the or each reinforcing member has a Young's Modulus of at least $6.9 \times 10^4$ MN/m$^2$.

* * * * *